[11] 3,614,233

[72] Inventor Nils Rob Johanne
[21] Appl. No. 35,883
[22] Filed May 8, 1970
[45] Patented Oct. 19, 1971
[73] Assignee Saab Aktiebolag
Linkoping, Sweden
Continuation of application Ser. No.
600,189, Dec. 8, 1966, now abandoned.

[54] DEVICE FOR LINEAR DISPLACEMENT OF A PLANE OPTICAL IMAGE IN ITS OWN PLANE
8 Claims, 5 Drawing Figs.

[52] U.S. Cl. .................................................. 356/83, 178/7.6, 350/6, 350/285
[51] Int. Cl. ........................................................ G01j 3/06
[50] Field of Search ........................................... 356/83, 84, 88–101; 350/6, 7, 285; 178/7.6

[56] References Cited
UNITED STATES PATENTS
2,630,736  3/1953  Beitz ............................. 356/83
................ 350/6
................ 350/6 UX
................ 356/83

Primary Examiner—Ronald L. Wibert
Assistant Examiner—F. L. Evans
Attorney—Beale and Jones ABSTRACT: An optical apparatus for displaying spectral images is disclosed, the device including two reflecting planes fixed at right angles to each other but displaceable with respect to an image plane to permit a scanning of an optical image. Both reflecting planes are at a 45° angle with the image plane, and the line of intersection of the two reflecting planes oscillates in a direction which is transverse to the line of intersection of the reflecting planes, whereby the image is scanned sinusoidally past an opening in the image plane. A light-sensitive element behind the opening transforms the light into an electrical signal which corresponds in amplitude to the light intensity and which can be displayed on an oscilloscope. A sensing means tracks the swing movement, generating a signal which may be used as one coordinate axis of the oscilloscope display. A phase correction network is located between the sensing means and the oscilloscope so that the correct phase relationship between the oscillating swing and the display may be obtained.

3,614,233

DEVICE FOR LINEAR DISPLACEMENT OF A PLANE OPTICAL IMAGE IN ITS OWN PLANE

BACKGROUND OF THE INVENTION

This is a continuation of my application Ser. No. 600,189, filed Dec. 8, 1966, now abandoned.

The main purpose of the present invention is to present on the screen of an oscilloscope the profile of a spectral line or any other distribution of a light intensity versus wavelength. The invention may be used, for example, when measuring the parameters of a spectral line in order to determine temperature, when adjusting optical instruments, in particular spectroscopes and interferometers, and also as an integral part of a comparator to evaluate spectral plates.

Earlier devices for the proposed purpose are available and like the present design, they are based on a linear displacement of the optical image. However, in designing these other devices there has been no recognition of the condition upon which the present invention is based, viz that a reproduction which is strictly free of distortion can be obtained only if the optical image remains in its own plane during the displacement.

SUMMARY OF THE INVENTION

It is, therefore, an object of this invention to provide an optical display device which will permit the accurate production of an optical image on an image plane, and which will permit the image to be displaced linearly to produce a scanning motion which is steady and entirely free from distortion.

Another object of this invention is to provide an optical device for linear displacement of a plane optical image which includes a swing means to produce oscillatory motion, said swing means being carried by friction-free supports which provide a swing motion free from vibrations.

A further object of the invention is to provide a displacement device for oscillating an optical image in its own plane, said device including a swing so mounted as to be statically and dynamically balanced, and means for producing and sensing oscillatory motion in said swing whereby a steady, distortion-free image is produced.

The device of the present invention is characterized, in principle, by two reflecting planes, fixed at right angles relative to each other and which both form 45° angles with the plane of the produced image. The planes are movable in such a way that the direction or their normals remains fixed and so that the line defined by the intersection of the two reflecting planes moves in a plane which is parallel to the plane of the image; further, the motion is in a direction transverse to the line of intersection. The planes are arranged in such a way relative to the rays of light which form the image that the rays are reflected once in each plane. Then, in the displacement of the reflecting planes in the direction perpendicular to the lines of intersection is defined by a distance RR', the image will be displaced linearly in the same direction in its own plane, a distance PP'=2×RR'. The known devices to achieve such displacement of the reflecting planes include guide means constraining the planes to move straight linearly, but in such an arrangement the performance will depend strongly on the smoothness of the guiding bars or grooves. This difficulty can be completely avoided if one takes advantage of the fact which the above-discussed optical function allows, namely that the reflecting planes may, during the course of displacement, also be moved perpendicularly to the displacement direction (i.e., vertically) without affecting the image. The movement of the reflecting planes may thus be accomplished by means of a device where the planes are suspended in a swing rather than a grooved guide of similar mechanism. The displacement of the intersection of the reflecting planes must be in a plane which is parallel to the image plane to obtain the desired optical function. Thus, the displacement of the image is achieved by providing a swing which will move symmetrically and periodically, preferably sinusoidally around its equilibrium position.

In a modification of the simple swing arrangement which provides the foregoing scanning motion, the reflection planes may be attached to a bar, which is a member of a moving system of four bars. Together the bars form a parallelogram, the top and bottom horizontal bars and the vertical side bars being interjoined at the corners of the a parallelogram. The system of bars is mounted so as to perform a swinging motion in the plane of the parallelogram, the restoring torque for this movement being supplied by torsion shifts. which are perpendicular to the plane of the bars and fixed at the midpoint of the two opposing side bars. The swinging motion changes the configuration of the parallelogram, while permitting the bars which carry the reflecting planes to remain horizontal while moving in a reciprocal path.

The movements of the swing are tracked by an electromagnetic sensor, which generates a signal which is synchronous with the movement of the swing. This signal is fed to an oscilloscope to deflect the beam therein in one of its two coordinate axes. A slit or a similar opening is located in the plane image plane and located behind the image plane is a light-sensitive element which transforms the light passing through the slit into another electrical signal, which is also applied to the oscilloscope to control its deflection in the other coordinate axis. A characteristic feature of the present invention is that the scanning of a spectral line proceeds in a continuous back and forth scanning movement without any interruption of the scan, as is the case when the scan sweeps only in one direction. An advantage of the present scanning technique is that if there is a shift in the phase relationship between the movement of the optical image and the signal representing that movement, the discrepancy would immediately reveal itself by a doubling of the trace on the oscilloscope screen. A continuously variable phase corrector network in connected between the electrical devices which sense the movement of the swing and the input to the oscilloscope; in this way, a correct phase relationship is obtained.

Be securing synchronization between the oscilloscope scan and the image displacement in this way, the zero passage of the oscilloscope scanning signal will unequivocally coincide with a definite position of the swing in relationship to the slit. Thus, the present invention includes means for generating a movement signal which will have a zero value when the median of the intensity distribution of the image just coincides with the slit. This generated signal has a positive and negative sign when the median is displaced relative to the slit, the sign indicating toward which side the displacement has taken place. This means that the present invention, contrary to previously known spectral line scanning devices, has the advantage of being a suitable component for a servo system for an automatic and objective measurement of the position of the line center of the spectral line defined by the median. The median here means a line which is parallel to one axis of the oscilloscope, and which divides the intensity distribution as seen on the oscilloscope screen in such a way that the intensity integrals over the two parts of the oscilloscope display along the other axis have the same value. This way of defining the center line means that the sensitivity to noise is low. This also means that the plurality of different intensity distributions can be analyzed by merely changing the integration integral on the same measuring device.

More particularly, the invention relates to a scanning device for displacing an optical image and indicating the light intensity of the image, comprising an image plane having a slit therein, a swing positioned in front of the image and swingable to and fro in a plane parallel therewith. The swing means includes parallel arms which are swingably or pivotally suspended from parallel axes, which are spaced in a direction transverse to the slit so as to pass on either side thereof, and a support member interconnecting the arms at hinge lines which are equidistant from said axes and parallel therewith. The device further includes means for imparting an oscillatory motion to the swing means along its swinging plane. Two reflecting planes carried on the support member receive light rays and produce an optical image plane. The reflecting planes are located at right angles to one another so that a ray of light entering one of the reflecting planes is reflected to the other, and thence in a direction which is opposite and parallel wit h the entrance direction, the reflecting planes being so angularly disposed that they form equal angles with the image and swing planes. The line of intersection of the reflecting planes is parallel to the slit and perpendicular to a plane through the hinge lines so that when the swing is oscillated the line of intersection will be displaced parallel to itself in a plane parallel to the swinging plane. A light-sensitive element is located behind the slit in the image plane and is adapted to sense the varying intensity of the light reflected by the reflecting planes and passing through the slit during the oscillatory motion of the swing. The light-sensitive element generates a first electrical signal corresponding to the light intensity sensed. A signal generating means is provided for sensing the position of the swing and for producing a second signal which represents displacement of the optical image and hence is synchronous with the oscillatory motion. Display means connected to the light sensitive element and to the signal generating means is provided to receive the first and second electric signals so that a graphical representation of the light intensity versus the displacement of the optical image can be obtained.

BRIEF DESCRIPTION OF THE DRAWINGS

The foregoing and additional objects, features and advantages of the invention will be apparent to those skilled in the art from the following detailed description of a preferred embodiment thereof, taken with the accompanying drawings, in which.

DESCRIPTION OF A PREFERRED EMBODIMENT

Figure 1:
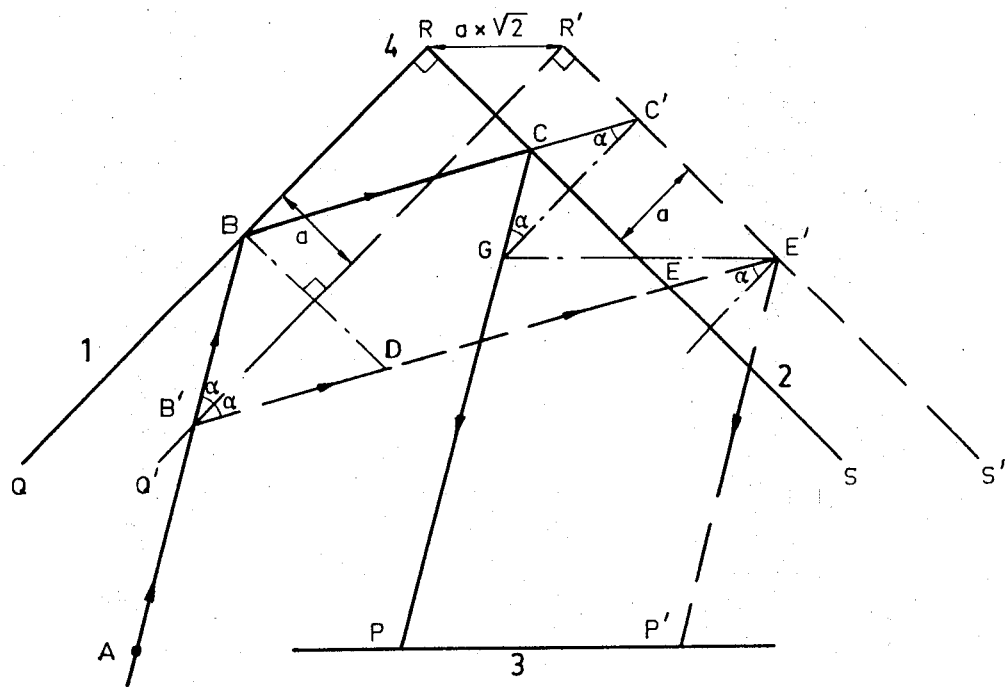
FIG. 1 is a diagram illustrating the theory that a displacement of a reflecting plane will proportionally displace an image on an image plane.

Referring more particularly to the drawings, FIG. 1 shows the light path in the two reflecting planes 1 and 2 and constitutes an illustration of the following proof that the optical way to the image plane 3 remains constant, i.e. that the image is displaced in its own plane, and that the image is displaced proportionally to the displacement of the reflecting planes 1 and 2. To prove that the image is displaced linearly in it s own plane proportionally to the displacement of the reflecting planes, consider an incident ray which inclines at an arbitrary angle in a plane perpendicular to the reflecting planes 1 and 2. In accordance with FIG. 1, it is presumed that PP' in the image plane 3 is parallel to RR', the displacement of the line of intersection of the reflecting planes 1 and 2 and that QR, Q'R', RS and R'S' all form 45° angles with PP'. Those different equalities of the angles which are indicated in the Figure are assumed to be self-evident and also that is holds that AB//CP//E'PE½ and D'E'11BC. It then is to be proved:

1. That the optical distance transversed by the ray from the object to the image remains the same independent of the size of the displacement.
2. That the displacement of the ray in the plane of the image is independent of the angle of incident and equals 2×RR'.

First to be proved is that if A is an arbitrary point on the incident ray, it holds ABCP=AB'E'P'. Obviously, ABC=AB'E'. Mark a point G on CP so that EE'=CG. Statement 1 is proved if it is proved that GE'//PP'. Draw CC'//EE'. Since CC'=CG, it follows that C'G=2a. But C'E'=BD=2a. Thus, C'G=C'E', which proves the statement. Statement 2 follows from PP'=GE'=2a√2=2×(RR'), this equation stating that the distance PP' traversed by the spectral lines on an image plane is twice the displacement RR' of the reflecting planes.

Now consider a ray which does not incline in a plane forms to the reflecting surface that form an arbitrary angle $\beta$ with this plane. According to the reflection law, this ray will always form the angle $\beta$ with the image plane and the previous proof which holds for the protection of the rays on this image plane can be generalized to hold for the rays themselves provided only that the optical path is everywhere multiplied by a constant factor=$1/\cos \beta$.

Figure 2:
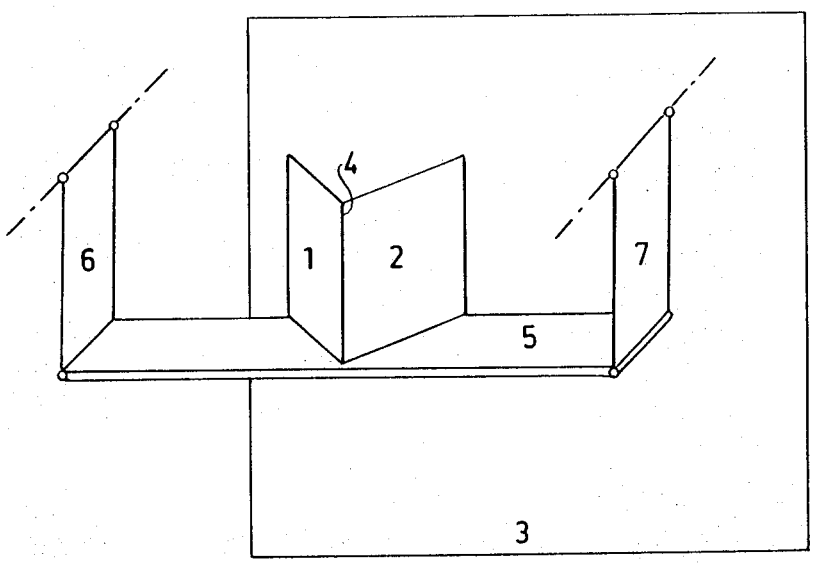
FIG. 2 is a perspective view showing a pair of reflecting planes suspended by a swing.

FIG. 2 shown the reflecting planes 1 and 2 suspended in a swing with a cross bar 5 and swinging bars 6 and 7. The movements of the bars are made possible either by making the connection of the swinging bars in the from of a joint, for example, a hinge, or by making the swinging bars of flexible material, constituting, for example, plate springs.

Figure 3:
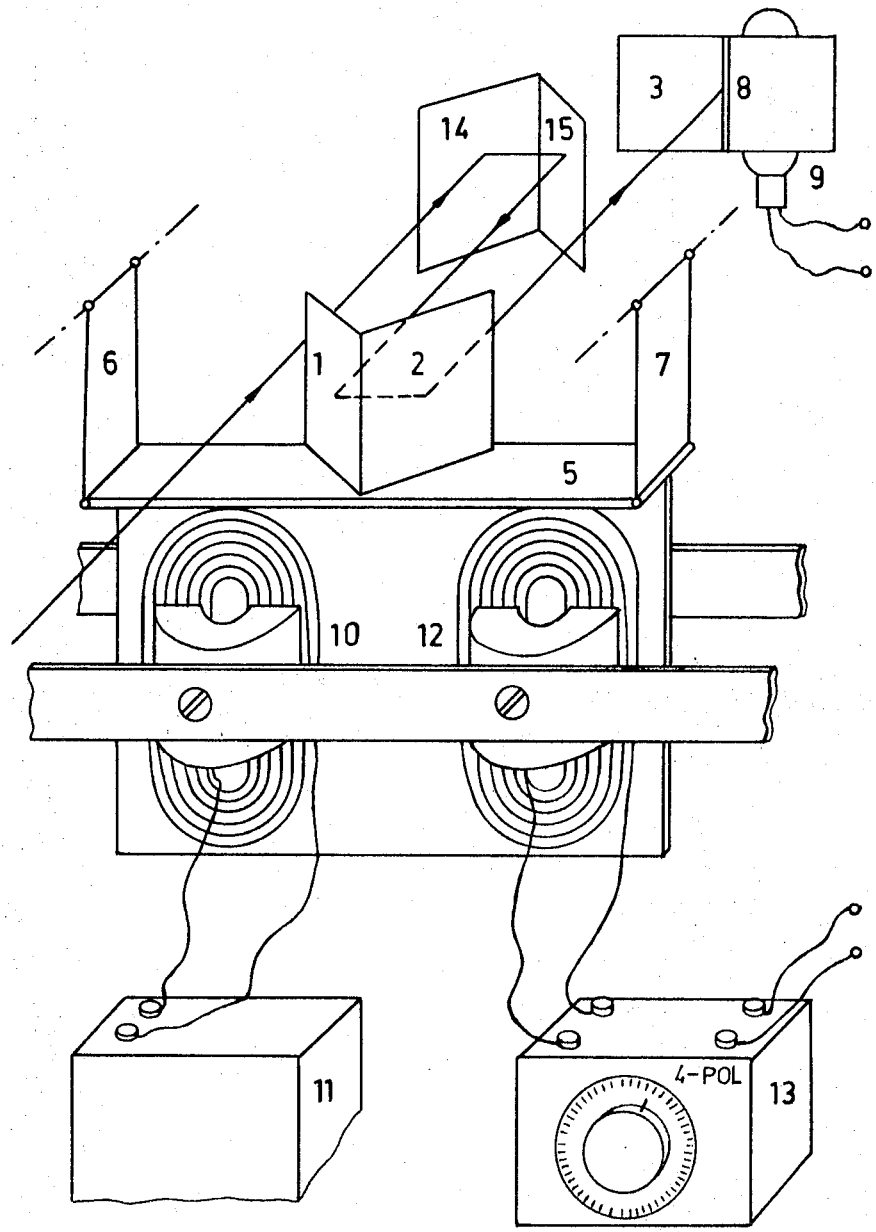
FIG. 3 is a perspective view showing one embodiment of the optical image displacement device according to the present invention.

FIG. 3 shown the scanning device in more detail wherein the swing for supporting the reflecting planes 1 and 2 is positioned in front of the image plane 3 on a support 5 which in swingable to and for in a plane parallel to the image plane. The swing has parallel arms 6 and 7 which are swingably suspended from parallel axes 6' and 7', respectively. The axes are spaced in a direction transverse to the slit 8 in image plane 3. The support member or cross bar 5 interconnects the arms 6 and 7 at hinge lines 5' and 5" which are equidistant from and parallel to their respective axes 6' and 7'. An oscilloscope 32 displays on one axis (e.g. the horizontal, or Y axis) the variation of light intensity, the other (vertical) axis representing a length direction; that 15, it displays the intensity of a spectral line versus its wavelength. This length direction which is represented along one axis of the oscilloscope is perpendicular to the slit 8, which is in the plane of the image.

A reflector formed by two perpendicular planes 14 and 15 is positioned to reflect the light rays emerging from a preceding light source object onto the reflector planes 1 and 2 on the swing. Planes 1 and 2, in turn, reflect the rays of light towards the image plane 3, as illustrated by the arrows in FIG. 3. A lightsenstive element 9 transforms the intensity of the light which passes through slit 8 in the image plane 3 by means of electrical transducers to a first electrical signal which deflects the beam of the oscilloscope 32 along one coordinate axis, (e.g. the Y-axis).

In order to put the swing into a periodic, sinusoidal movement, electromagnetic forces may be used. In the present case, this is carried out by feeding a sinusoidal current to a first coil 34, which is rigidly mounted on the cross bar 5 of the swing and which moves in an air gap between two permanent magnets, one of which is seen at 10 in FIG. 3. In order to amplify the restoring tendency of the swing, the swinging or side bars 6 and 7 of The swing may constitute plate springs. The same effect may of course be achieved by mounting additional springs to a hinged swing. This above-described arrangement provides a means for imparting an oscillatory motion to the swing along its swinging plane. A power supply 11 provides the electrical current for coil 34.

Figure 4:
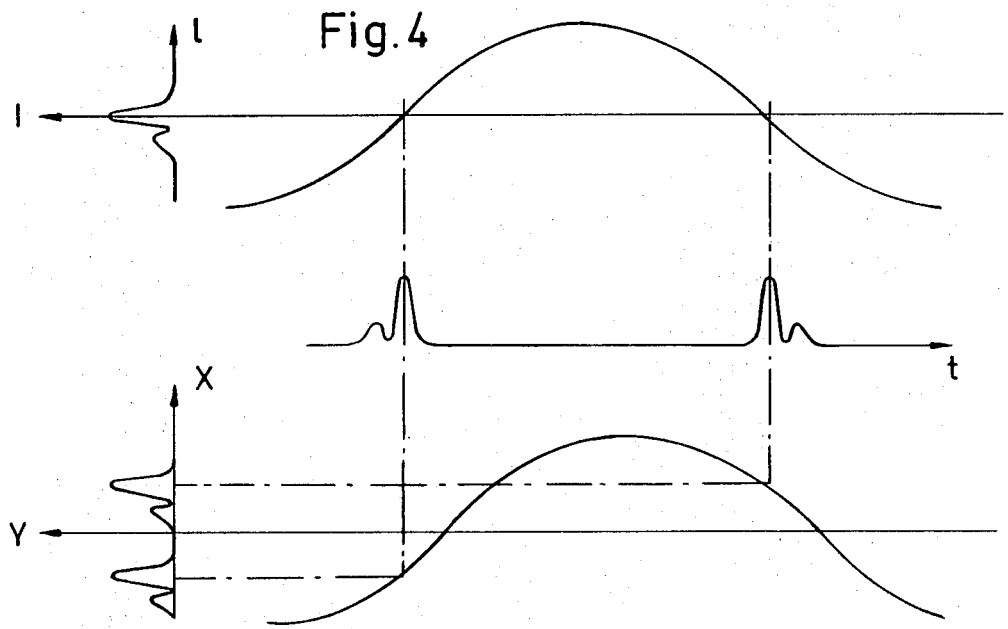
FIG. 4 is a diagram showing the effect of an incorrect phase relationship between the movement of the swing and the measured light intensity.

A signal generating means for sensing the movement of the swing can be performed electromagnetically by inducing a voltage in a second coil 36, rigidly mounted on cross bar 5, which moves in an air gap between a pair of permanent magnets, one of which is shown at 12. The voltage induced in this coil 36 by the magnets is fed to the electric four pole network 13, which may constitute a conventional phase-shifting network with a variable phase delay. This network is, in turn, connected to the other input of the oscilloscope in order to perform the deflection of its beam in the other coordinate axis, (e.g. the X-axis), whereby the graphical representation of the light intensity versus the displacement of the optical image can be reproduced on the oscilloscope screen. FIG. 4 shows the effects of an incorrect phase relationship between the movement of the swing and the sweep signal at the oscilloscope. The trace of the oscilloscope screen is coupled.

When using an apparatus of this kind described above and illustrated in FIG. 3, difficulty under certain circumstances may arise due to the mechanical vibrations generated by the device, which are difficult to avoid. This difficulty, however, can be overcome by the embodiment described below and illustrated in FIG. 5, wherein reference numerals 1, 2, 14 and 15 indicate the reflecting planes, 3 the image plane of the generated real optical image, 8 the slit, and 9 the light-sensitive element. In this embodiment, the reflecting planes are attached to an upper bar 17, which is a member of a moving system of four bars, 17, 18, 19 and 20. Together the bars form a parallelogram, the bars being interconnected at the corners of the parallelogram by joints 21, functioning like door hinges. The system of bars is mounted on a pair of torsion shafts 22 and 23, which are connected at the midpoints of the opposing bars 19 and 20, respectively, whereby the system performs a swinging motion in the plane of the parallelogram. A counterpoise 24 is carried by the lower bar 18 to balance the system dynamically in order to avoid mechanical vibrations and the swing is supported by the torsion shafts in an apparatus stand 25 so that the plane of the swinging motion is parallel to the image plane 3. The torsion shafts 22 and 23 supply the restoring torque for the movement of the system of bars, the shafts being perpendicular to the plane of the bars.

The force which generates the periodic motion of the parallelogram is supplied by the driving coil 26 which operates in a magnetic field provided by a pair of horseshoe magnets 28 attached to apparatus stand 25. Coil 26 is fixed to lower bar 18, whereby it can move between magnets 28, and is fed by an AC source 30. The required restoring force is obtained from the torsion shafts 22 and 23, which are rigidly connected to the bars 19 and 20 and to apparatus stand 25.

The rays which generate the picture and which come from an image source ahead of the Figure are reflected in succession by the reflecting planes 14, 15, 1 and 2. Subsequently, the rays strike the image plane 3, and those rays which pass through the slit 8 give rise to a voltage change at the output of the light-sensitive element 9. To obtain a linear periodical displacement of the optical image in its own image plane 3 in a direction perpendicular to the slit 8, the bar 17 which carries the reflecting planes 1 and 2 is forced to move periodically in a plane parallel to the image plane 3 and in a direction substantially perpendicular to the slit 8 by means of driving coil 26 and the permanent magnets 28.

In order to sense the position of the bar 17 electrically, a sensing coil 27 is mounted on the bar 17 so as to pass between and in the field of a pair of permanent magnets 29, which are attached to the apparatus stand 25. When the sensing coil moves in this magnetic field, a signal is induced and this signal is synchronized with the movement of the bar 17 be means of a phase-shifting network 31 so that the two signals from the light-sensitive element 9 and the network 31 respectively are in phase. The latter signal is applied to the X-plates of the oscilloscope 32, thereby generating the X-sweep, and the former signal from the light-sensitive element 9 is connected to the Y-plates of the same oscilloscope 32 to obtain a presentation of the intensity profile of the line. Obviously, the two signals can be shifted, so that the X-input obtains the intensity signal and the Y-input obtains the movement signal from the network 31.

Figure 5:
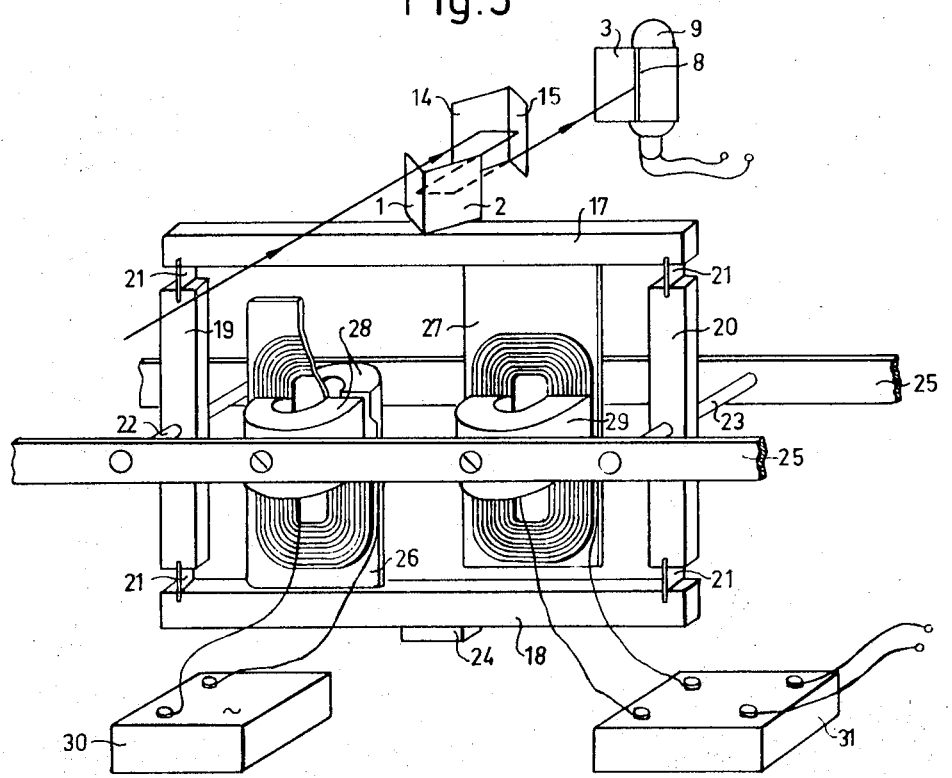
FIG. 5 is a perspective view of another embodiment showing a modification of the swing and the optical image displacement device.

Owing to the use of the torsion shafts 22 and 23 to obtain the restoring force friction of the system is extremely low, and if the joints 21 are made of leaf springs as shown in FIG. 5, bearing friction will be eliminated also.

The type of motion used in the described realization of the device is sinusoidal and symmetrical around the resting position of the system of bars, and provides a linear scan of the light across the slit in the image plane.

I claim:

1. A scanning device for displacing an optical image, comprising:

a. An image plane having a slit therein arranged to receive rays of light producing an image thereon;
 b. a swing means located in front of the image plane and swingable to and fro in a plane parallel to the said image plane, said swing including first and second parallel arms which are pivotally suspended from first and second spaced parallel axes, said parallel axes being spaced in a direction transverse to the slit, and a support means extending between said first and second arms and being hingedly connected to said first and second arms, said hinged connections being equally distant from said axes and parallel therewith;
 c. means for imparting an oscillatory motion to the swing means along its swing plane;
 d. two reflecting planes mounted on said support means for receiving rays of light and producing the optical image in said image plane, said reflecting planes being at right angles to one another so that a ray of light entering one of the reflecting planes is reflected by the other in a direction which is opposite and parallel to the entrance direction, each of said reflecting planes forming a 45° angle to the swing plane and the line of intersection of the reflecting planes being substantially parallel to the slit of the image plane; and
 e. sensor means behind the slit of the image plane for sensing the varying intensity of light reflected by the reflecting planes and passing through the slit during the oscillatory motion of the swing.

2. The scanning device of claim 1, wherein the support member and the arms are interconnected by leaf springs.

3. The scanning device of claim 2, wherein the swing is suspended by means of torsion shafts connected to said parallel arms.

4. A scanning device for displacing optical images and indicating the light intensity variations of the images, comprising:

a. an image plane having a slit therein arranged to receive rays of light producing an image thereon;
 b. swing means positioned in front of said image plane and swingable to and fro in a plane parallel to the image plane, said swing means including first and second parallel arms which are pivotally suspended from first and second spaced axes, respectively, said parallel axes being spaced in a direction transverse to said slit in said image plane, and a support member extending between said first and second arms and being hingedly connected to said arms, said hinged connections being equidistant from and parallel to the axes of their respective arms;
 c. means for imparting an oscillatory motion to the swing along its swinging plane;
 d. two reflecting planes mounted on said support member for receiving rays of light and producing the optical image on said image plane, said reflecting planes being at right angles to one another so that a ray of light entering one of the reflecting planes is reflected by the other plane in a direction which is opposite and parallel to the entrance direction, said reflecting planes being angularly disposed so that each of the reflecting planes forms a 45° angle with the image and swinging planes and the line of intersection of the reflecting planes is parallel to the slit and perpendicular to a plane through said hinge lines so as to be displaced parallel to itself in a plane parallel to the swinging plane upon oscillation of the swing;
 e. a light-sensitive element located behind the slit of the image plane, said light-sensitive element being adapted to sense the varying intensity of the light which is reflected by said reflecting planes and passes through said slit during the oscillatory movement of the swing, said light sensing element generating a first electric signal corresponding to the light intensity sensed;
 f. signal generating means for sensing the position of the swing and for producing a second electric signal which represents the displacement of said optical image and is synchronous with said oscillatory motion; and a display means connected to said light sensing element and said signal generating means for receiving and displaying said first and second electric signals to produce a graphical representation of the light intensity versus the displacement of the optical image.

5. The scanning device of claim 4, wherein one end of each of said arms is connected to the end of the support member and the other end of each of said arms is connected to an auxiliary bar to form a parallelogram, and wherein the means for imparting an oscillatory motion to the swing comprises a drive coil mounted on said parallelogram, a first stationary magnet adjacent said drive coil, and a power source connected to said for inducing coil for therein a magnetic field so that said drive coil will be moved to and fro in said magnetic field, and wherein said signal generating means includes a sensing coil, mounted on said parallelogram and a second stationary magnet adjacent said sensing coil, said sensing coil being connected to said display means, one of said drive and sensing coils being mounted on said support member, and the other of said coils being mounted on said auxiliary bar for motion with said swing.

6. The scanning device of claim 4, further including a phase-shifting network connected between the signal generating means and said display means to correct the second electric signal so that it is in phase with the first electric signal.

7. The scanning device of claim 5, wherein said sensing coil is mounted on said support member and said drive coil is mounted on said auxiliary bar, said first and second stationary magnets being fixedly supported adjacent the swinging plane of said swing.

8. The scanning device of claim 7, wherein the swing is suspended by means of torsion shafts connected to said parallel arms.

UNITED STATES PATENT OFFICE
CERTIFICATE OF CORRECTION

Patent No. 3,614,233            Dated October 19, 1971

Inventor(s) NILS ROBERT DAHR ASLUND

It is certified that error appears in the above-identified patent and that said Letters Patent are hereby corrected as shown below:

Claim 1, paragraph (d), line 2, "in" should be --on--.

Claim 4, paragraph (b), line 5, after "spaced" insert --parallel--.

Claim 4, column 7, line 1, --(g)-- should be inserted at the beginning of said paragraph.

Claim 5, line 7, after "to said" insert --drive coil--.

Claim 5, line 8, after "inducing" delete "coil for".

Signed and sealed this 4th day of April 1972.

(SEAL)
Attest:

EDWARD M. FLETCHER, JR.            ROBERT GOTTSCHALK
Attesting Officer                    Commissioner of Patents